(12) United States Patent
Takasaki et al.

(10) Patent No.: US 7,021,670 B2
(45) Date of Patent: Apr. 4, 2006

(54) JOINT FOR DOUBLE PIPE AND BRAZING METHOD THEREOF

(75) Inventors: Hiromi Takasaki, Sano (JP);
Yoshikazu Takamatsu, Sano (JP); Koji Murayama, Tatebayashi (JP)

(73) Assignee: Calsonic Kansei Corporation, Tokyo (JP)

( * ) Notice: Subject to any disclaimer, the term of this patent is extended or adjusted under 35 U.S.C. 154(b) by 28 days.

(21) Appl. No.: 10/396,707

(22) Filed: Mar. 26, 2003

(65) Prior Publication Data

US 2003/0218332 A1    Nov. 27, 2003

(30) Foreign Application Priority Data

Mar. 27, 2002 (JP) .......................... P2002-089786

(51) Int. Cl.
*F16L 39/00* (2006.01)

(52) U.S. Cl. .............................. 285/124.1; 285/123.3; 285/123.15; 285/123.1

(58) Field of Classification Search .. 285/124.1–124.5, 285/123.1, 123.15, 382.4, 123.3
See application file for complete search history.

(56) References Cited

U.S. PATENT DOCUMENTS

| 5,397,102 A | * | 3/1995 | Kingman | 251/368 |
| 6,009,908 A | * | 1/2000 | Hartnagel et al. | 285/123.1 |
| 6,145,545 A | * | 11/2000 | Hartnagel et al. | 285/123.1 |
| 6,533,328 B1 | * | 3/2003 | Takamatsu | 285/123.15 |
| 2001/0020786 A1 | * | 9/2001 | Takamatsu et al. | 285/123.1 |

FOREIGN PATENT DOCUMENTS

JP            2595578 B2    1/1997

* cited by examiner

*Primary Examiner*—Aaron Dunwoody
(74) *Attorney, Agent, or Firm*—Foley & Lardner LLP

(57) ABSTRACT

A joint for joining a double pipe, which is provided with an outer pipe for transfer of a first fluid, and an inner pipe for transfer of a second fluid. The joint is provided with a flange including a first through bore and a second through bore, a branch portion and a connection pipe having a first end and a second end, the first end being brazed with the inner pipe of the double pipe and the second connection portion being inserted into the second through bore and defining a second portion for connection of the second circuit pipe, whereby the connection pipe transfers second fluid between the second circuit pipe and the outer pipe of the double pipe. The branch portion is provided with a first connection portion for connection of the first circuit pipe, the first connection portion being inserted into the first through bore.

13 Claims, 12 Drawing Sheets

JOINT FOR DOUBLE PIPE AND BRAZING METHOD THEREOF

BACKGROUND OF THE INVENTION

1. Field of the Invention

The present invention relates to a joint for connecting double pipes, each of which is provided with an outer pipe, an inner pipe supported inside of the outer pipe and connection ribs for connecting the outer pipe and the inner pipe and is integrally formed by extrusion forming or drawing forming, and a brazing method for brazing the joint with the double pipes.

2. Description of the Related Art

Conventional double pipe is provided with an outer pipe for transfer of a first fluid and an inner pipe for transfer of a second fluid. The double pipe is categorized as two types in a viewpoint of production methods thereof. According to a first type, the outer pipe and the inner pipe inserted thereto, which are individually produced, are ironing-formed so that projections formed on an inner surface of the outer pipe are press-welded to an outer surface of the inner pipe, thereby the inner and outer pipes are formed to be a double pipe. According to a second type, the outer pipe, the inner pipe and ribs for connecting the outer pipe and the inner pipe are integrally formed by extrusion forming or drawing forming. The double pipe of the second type is heavily used because of a low production cost thereof.

Japanese Patent No. 2595578 discloses a related art of a joint for a double hosepipe made of rubber.

SUMMARY OF THE INVENTION

The joint of the related art cannot be applied for connecting a double pipe of the second type but the first type. Therefore the double pipe of the second type has no means for easy connection.

The present invention is achieved in view of the above problem and is intended for providing a joint preferably applied for connecting double pipes having an outer pipe, an inner pipe supported inside of the outer pipe and connection ribs for connecting the outer pipe and the inner pipe which are integrally formed by extrusion forming or drawing forming.

A joint of the present invention is applied for joining a first double pipe to a second double pipe, where each of the first and second double pipes is provided with an outer pipe for transfer of a first fluid, an inner pipe for transfer of a second fluid and plural ribs for connecting the outer pipe and the inner pipe.

According to a first aspect of the present invention, the joint is provided with a first connection portion for connection of the outer pipe of the second double pipe, a second connection portion for connection of the inner pipe of the second double pipe and a branch portion. The branch portion is provided with an inner flow path which communicates with the first connection portion so as to transfer the first fluid, a first junction portion for joining the outer pipe of the first double pipe and a second junction portion for joining the inner pipe of the first double pipe. The outer pipe of the first double pipe is brazed with the first junction portion so as to communicate with the inner flow path and transfer the first fluid. The second junction portion is provided with a through hole and a first support portion for supporting brazing filler metal for brazing the inner pipe of the first double pipe with the second junction portion. The first junction portion is further provided with a stopper for stopping an end of the outer pipe of the first double pipe so that the first double pipe is disposed at an appropriate position for brazing and the inner pipe thereof passes through the through hole and communicates with the second connection portion.

Preferably, the first support portion is formed as a conical recess on an inside of the second junction portion.

More preferably, the first support portion is shaped so as to keep a molten pool of the brazing filler metal when the first support portion is faced upward.

More preferably, the second junction portion is further provided with a barrier member for preventing the molten pool from flowing out.

More preferably, the first connection portion and the second connection portion are formed as male or female components.

More preferably, the second connection portion is formed at an end portion of the inner pipe of the first double pipe.

More preferably, the joint is further provided with a connection pipe, wherein a first end thereof is brazed with an end portion of the inner pipe and a second end thereof is formed as the second connection portion.

More preferably, the first end of the connection pipe is further provided with a second support portion for supporting brazing filler metal.

More preferably, the second support portion is shaped so as to keep a molten pool of the brazing filler metal when the second support portion of the connection pipe is face upward.

More preferably, the brazing filler metal is sandwiched between an outer wall of the branch portion and the second support portion.

More preferably, the joint is further provided with a gap held between the inner pipe of the first double pipe and the through hole of the second junction portion so that molten brazing filler metal supported by the first support portion flows through the gap to braze the connection pipe with the inner pipe of the first double pipe.

The first double pipe with a partly removed outer pipe so as to expose the inner pipe thereof is disposed so as to dispose an end of the outer pipe close to the first junction portion and project the inner pipe from the through hole. Brazing filler metal is supported on the first support portion and the first support portion is faced upward. When the branch portion is heated so as to melt the brazing filler metal, the outer pipe and the inner pipe are simultaneously brazed with the first junction portion and the second junction portion.

According to a second aspect of the present invention, the joint is provided with a first connection portion for connection of the outer pipe of the second double pipe, a second connection portion for connection of the inner pipe of the second double pipe, a branch portion, a connection pipe and a gap held between the through hole of the second junction portion and the inner pipe of the first double pipe. The branch portion is provided with an inner flow path which communicates with the first connection portion so as to transfer the first fluid, a first junction portion for joining the outer pipe of the first double pipe and a second junction portion for joining the inner pipe of the first double pipe. The outer pipe of the first double pipe is brazed with the first junction portion so as to communicate with the inner flow path so as to transfer the first fluid. The second junction portion is provided with a through hole and a first support portion for supporting brazing filler metal for brazing the inner pipe of the first double pipe with the second junction portion. The inner pipe of the first double pipe passes through the through hole. The connection pipe is provided with a second support portion for supporting brazing filler metal so that the brazing filler metal is sandwiched between the second support portion and the branch portion. The gap is held between the through hole of the second junction portion and the inner pipe of the first double pipe so that molten brazing filler metal supported by the second support portion is pumped through the gap to braze the inner pipe of the first double pipe with the second junction portion by a capillary phenomenon.

Preferably, the second junction portion is further provided with a barrier member for preventing the molten brazing filler metal from flowing out.

More preferably, the joint is further provided with a flange for connection of the first connection portion and the second connection portion. The first connection portion is rotatably fixed to the flange. The first connection portion or the second connection portion can be caulked so as to steadily fix the flange.

The first double pipe with a partly removed outer pipe so as to expose the inner pipe thereof is disposed so as to dispose an end of the outer pipe close to the first junction portion and project the inner pipe from the through hole. Brazing filler metal is supported on the first junction portion and the second support portion. When the branch portion is heated so as to melt the brazing filler metal, the outer pipe is brazed with the first junction portion. Further, the molten brazing filler metal partly flows into a gap between the second junction portion and the inner pipe, thereby the outer pipe is brazed with the first junction portion, the inner pipe is brazed with the connection pipe and the inner pipe is brazed with the second junction portion.

DETAILED DESCRIPTION OF THE PREFERRED EMBODIMENT (A First Embodiment)

A first embodiment of the present invention will be described hereinafter with reference to FIGS. 1–6B.

Figure 1:
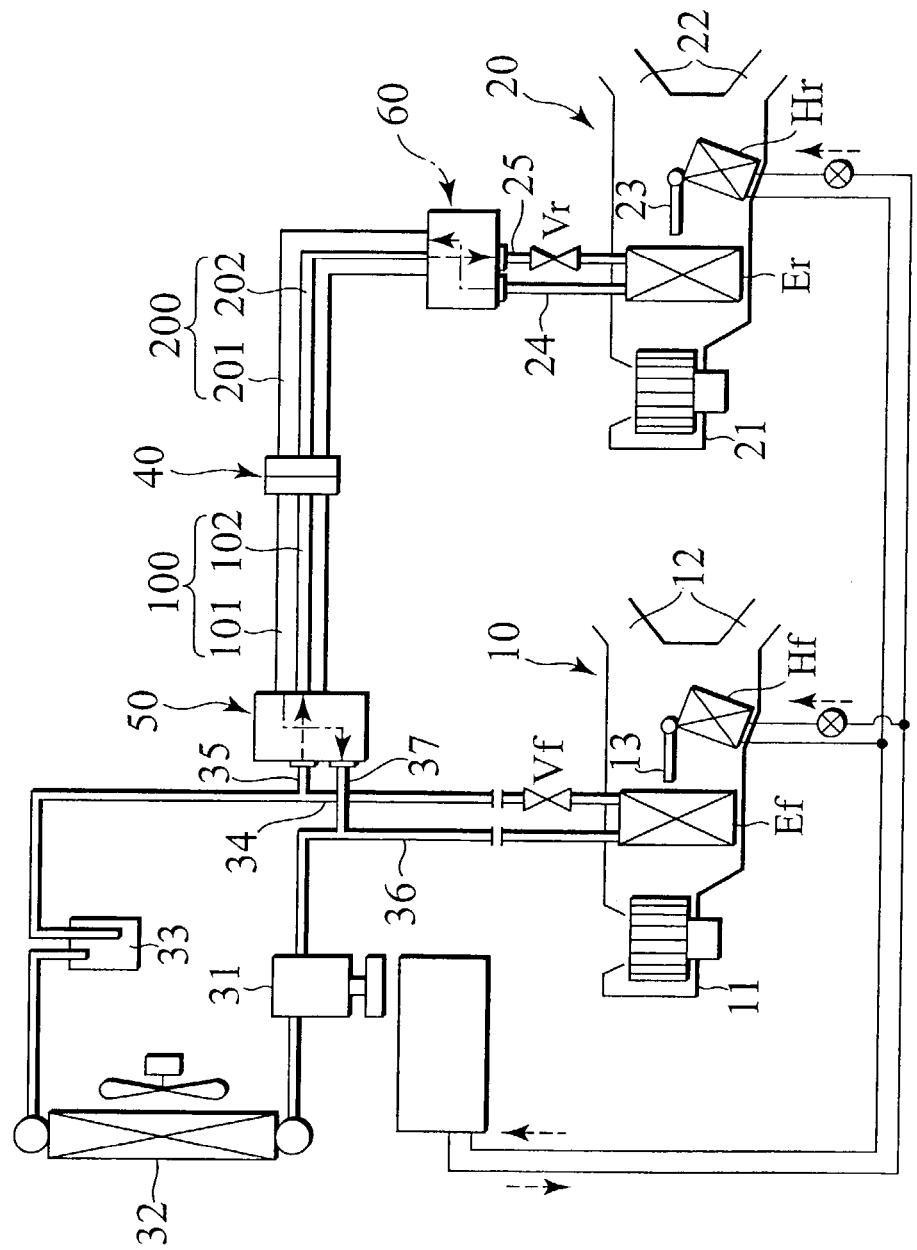
FIG. 1 is a schematic drawing of an air conditioner for an automobile to which a joint of the present invention is applied.

A dual type of an air conditioner shown in FIG. 1 is usually employed for a so-called one-box car. The air conditioner is provided with a front-seat air conditioner 10 for mainly air-conditioning of front seats, a rear-seat air conditioner 20 for mainly air-conditioning of rear seats. The rear-seat air conditioner 20 is installed in a vicinity of a center or a rear side of a car compartment. Air is taken from intake units 11, 21 and is conducted to evaporators Ef, Er so as to be cooled. The cooled air is appropriately heated by heater cores Hf, Hr and is blown out of outlet ports 12, 22 to the car compartment. Mixing doors 13, 23 for mixing the air which flows through the heater cores Hf, Hr and the air which by-passes the heater cores Hf, Hr are rotatably fixed to the respective heater cores Hf, Hr. The temperature of the air from the outlet ports 12, 22 is controlled by angles of the mixing doors 13, 23 so as to be favorable.

The evaporators Ef, Er, like the one commonly known, exchange heat between the air conducted thereto and cooling media which are expanded and cooled at expansion valves Vf, Vr so that the air is cooled. The heater cores Hf, Hr exchange heat between the air and an engine coolant which is heated by car engine so that the air is heated.

The front evaporator Ef, the rear evaporator Er, a compressor 31, a condenser 32, a liquid tank 33 and the expansion valves Vf, Vr are connected by coolant circuit pipes so that cooling cycle is constituted. A cooling medium which flows out of the liquid tank 33 and has a relatively high temperature and a relatively high pressure is branched into two by coolant circuit pipes 34, 35 branched in an engine room. The two flows of the cooling media are respectively conducted to the front evaporator Ef and the rear evaporator Er. The cooling media which respectively flow out of the front evaporator Ef and the rear evaporator Er and has relatively low temperatures and relatively low pressures flow through the coolant circuit pipes 36, 37 and interflow in the engine room so as to be drawn into the compressor 31.

According to the dual type air conditioner, double pipes are applied to the coolant circuit pipes between the rear evaporator Er and the cooling cycle. The dual type air conditioner includes a first double pipe 100 connected to the coolant circuit pipes 35, 35 and a second double pipe 200 connected to the rear evaporator Er. The first double pipe 100 and the second double pipe 200 are connected with each other via a joint 40. Outer pipes 101, 201 of the respective double pipes 100, 200 conduct evaporated low pressure cooling medium from the rear evaporator Er and inner pipes 102, 202 conduct condensed high pressure cooling medium from the liquid tank. The joint 50 communicates one end of the outer pipe 101 with the coolant circuit pipe 37 and also communicates one end of an inner pipe 102 with the coolant circuit pipe 35. In the same way, the joint 60 communicates one end of the outer pipe 201 with an outlet pipe 24 connected with an outlet port of the rear evaporator Er and also communicates one end of the inner pipe 202 with an valve inlet pipe 25 connected with an inlet port of the expansion valve Vr.

Figure 2:
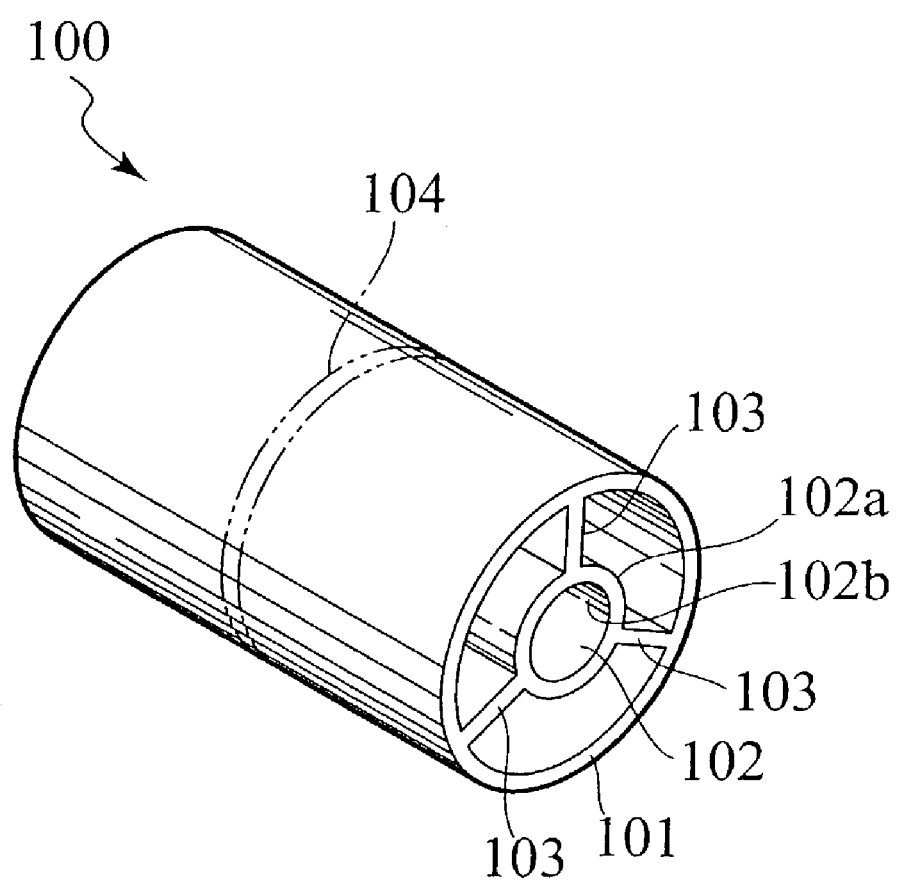
FIG. 2 is a perspective view of a double pipe.

The double pipe 100 is provided with the outer pipe 101, the inner pipe 102 and connection ribs 103 which connects the outer pipe 101 with the inner pipe 102 as shown in FIG. 2. The double pipe 100 is made of aluminum and is integrally formed by means of extrusion forming or drawing forming. An outer diameter of the outer pipe 101 is approximately in a range from 16 to 25 mm and an outer diameter of the inner pipe 102 is approximately in a range from 6 to 12 mm. Three connection ribs 103 are provided between the outer pipe 101 and the inner pipe 102 at even intervals. Such a structure has a good balance of hardness distribution thereof against a triaxial bending deformation so that a high design freedom is assured. The structure also has a good balance concerning with extrusion forming. The double pipe 200 is formed as the same method and a detailed description thereof is omitted.

The double pipes 100, 200 in the present embodiment have merits described hereinafter in comparison with a case where coolant circuit pipes are individually and respectively applied to the low pressure cooling medium and the high pressure cooling medium. The double pipes 100, 200 have a high stiffness against bending stress so that limitations of production conditions such as a bending speed are reduced and productivity thereof is increased. The number of pipes is decreased because two pipes are substituted for one double pipe, thereby a production process is improved and a cost thereof is reduced. It is uneasy to happen that the double pipes are accidentally bent in course of transportation or installation to a car body. The installation comes to be easy and a cost thereof is reduced because the double pipe need not be fixed with brackets.

A constitution of the joints 50, 60 will be described hereinafter with reference FIGS. 3A, 3B, 4A and 4B. The joint 60 is constituted substantially as same as the joint 50, therefore a description will be given concerning with the joint 50.

Figure 3A:
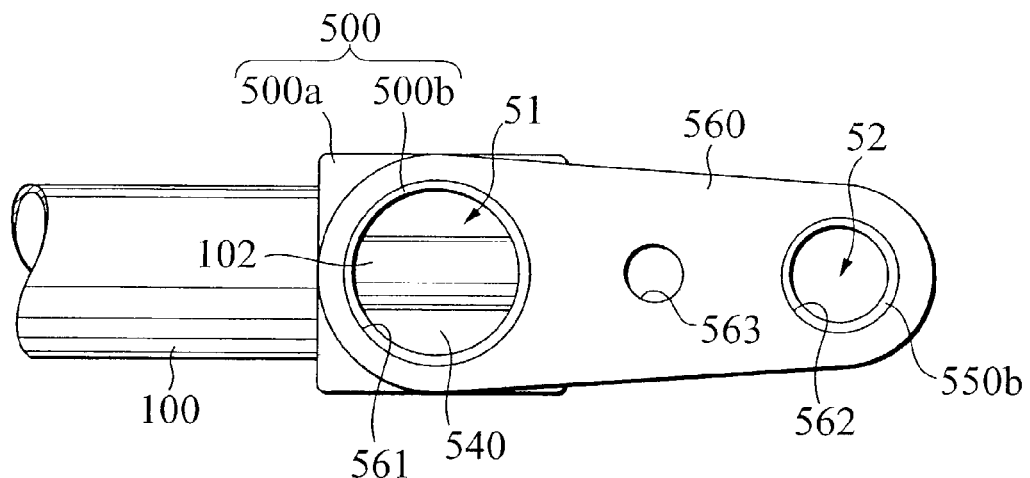
FIG. 3A is a plan view of a joint for the double pipe according to a first embodiment of the present invention.
Figure 3B:
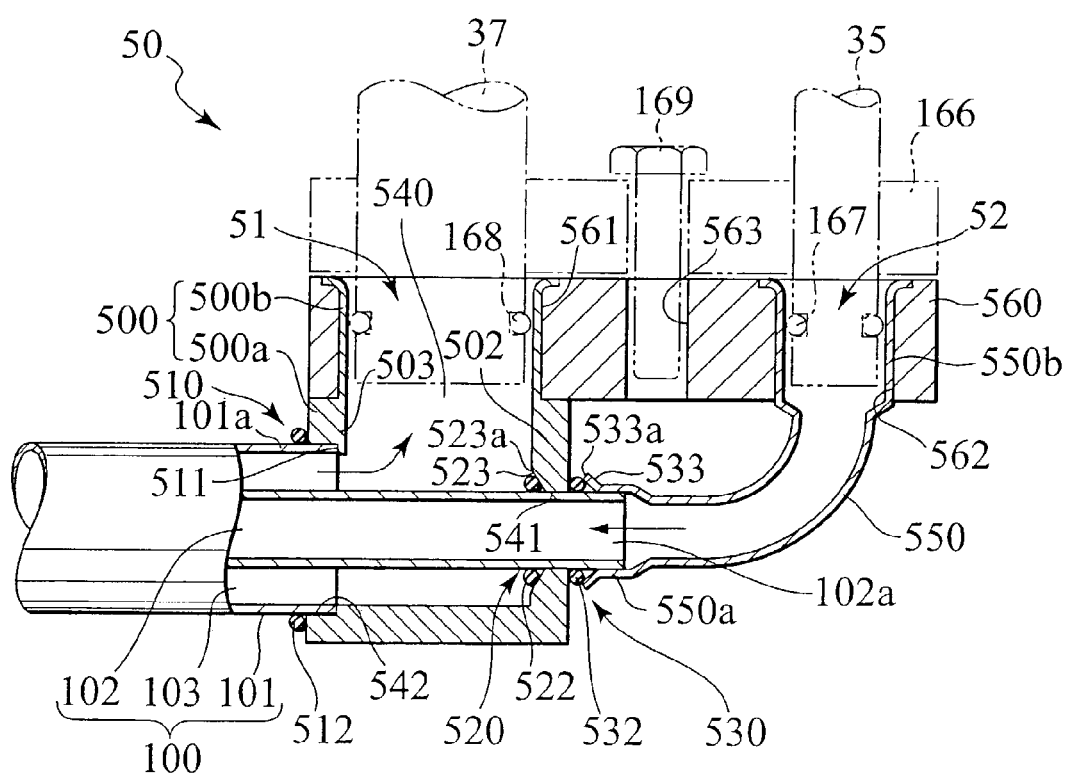
FIG. 3B is a partial cross-sectional view of the joint according to the first embodiment of the present invention.
Figure 4A:
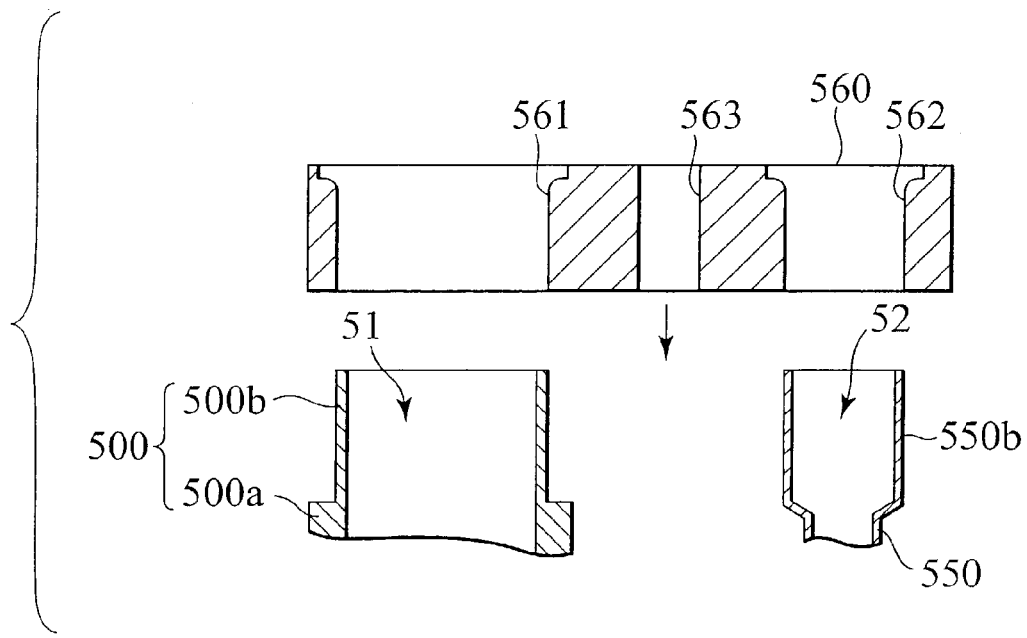
FIG. 4A is a cross-sectional view of a flange of the joint for connecting a first connection portion and a second connection portion of the double pipe according to the first embodiment of the present invention.
Figure 4B:
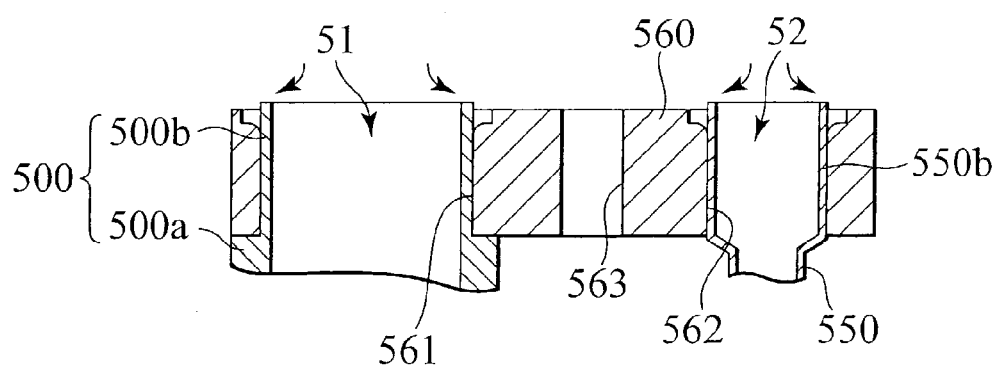
FIG. 4B is a cross-sectional view of the flange after connecting the first connection portion and the second connection portion.

In the vicinity of one end of the double pipe 100, the outer pipe 101 and the connection ribs 103 are partially removed and the inner pipe 102 is partially exposed as shown in FIG. 3B. The joint 50 is brazed to such a processed end of the double pipe 100. The processed end of the outer pipe 101 will be referred as an outer pipe end portion 101a hereinafter and the exposed end of the inner pipe 102 will be referred as an inner pipe end portion 102a.

The joint 50 is provided with a first connection portion 51 for connecting a coolant circuit pipe 37 which conducts the low pressure cooling medium, a second connection portion 52 for connecting a coolant circuit pipe 35 which conducts the high pressure cooling medium and a branch portion 500. The branch portion 500 includes an inner flow path 540 formed therein for conducting the evaporated low pressure cooling medium to the first connection portion 51. The branch portion 500 is further provided with a first junction portion 510 for joining the outer pipe end portion 101a and the branch portion 500 so as to communicate the outer pipe 101 with the inner flow path 540, a wall portion 502 which the inner pipe end portion 102a penetrates and a second junction portion 520 for joining the wall portion 502 and the inner pipe end portion 102a so as to communicate the inner pipe 102 with the second connection portion 52.

The branch portion 500 includes a base portion 500a at a lower side thereof according to FIG. 3B, which is formed in a substantially cubic shape, and a tubular portion 500b formed integrally with the base portion 500a. The tubular portion 500b also forms the first connection portion 51. The wall portion 502 is provided with a through hole 541 through which the inner pipe 102 passes. An opening 542 penetrating the wall 503 is formed on a wall 503 opposite to the wall portion 502. An inner diameter of the opening 542 is in accordance with the outer diameter of the outer pipe 101. The opening 542 forms the first junction portion 510 and the through hole 541 forms the second junction portion 520. The through hole 541 and the opening 542 are coaxially aligned. Thereby the inner pipe 102 projected from the outer pipe end portion 101a passes through the inner flow path 540 and is straightly extended so as to penetrate the wall portion 502.

The branch portion 500 can be made of various appropriate metals, for example, aluminum. A forming method thereof is not particularly limited but is exemplified as a cutting method. A butt joint method, where press-formed plural bodies are joined together, can be applied.

An inner surface of the opening 542 is stepped and projected inward so as to be a stopper 511 which abuts a tip of the outer pipe end portion 101a. The outer pipe end portion 101a is appropriately positioned by abutting the stopper 511.

The second junction portion 520 is provided with a support portion 523 for supporting a brazing filler metal 522 to be applied for brazing the inner pipe 102 there with. The support portion 523 is positioned inside the second junction portion 520 and is formed to be a conical recess on the inside of the second junction portion 520. When the inner pipe 102 is brazed to the second junction portion 520, a periphery 523a of the support portion 523 is faced upward so as to temporarily support the brazing filler metal 522 and keep the molten brazing filler metal 522 therein. The conical recess shape of the support portion 523 effectively conducts the molten brazing filler metal 522 to a small gap between the through hole 541 and the outer surface of the inner pipe 102.

The double pipe 100 is inserted through the opening 542 into the branch portion 500. The outer pipe end portion 101a abuts the stopper 511 so as to be brazed to the first junction portion 510. The exposed inner pipe 102 is brazed to the second junction portion 520.

According to the first embodiment, the inner pipe end portion 102a is further provided with a connection pipe 550 brazed therewith. A second end 550b of the connection pipe 550 forms the second connection portion 52. A brazed portion where the inner pipe end portion 102a is brazed to an end 550a of the connection pipe 550 will be referred as a third junction portion 530 hereinafter.

An end of the third junction portion 530 is formed tapered so as to be a support portion 533 for supporting a brazing filler metal 532. When the connection pipe 550 is brazed to the inner pipe end portion 102a, an aperture 533a of the support portion 533 is faced upward so as to temporarily support the brazing filler metal 532 and keep the molten brazing filler metal 532 therein. The tapered shape of the support portion 533 effectively conducts the molten brazing filler metal 532 to a small gap between the outer surface of the inner pipe 102 and the inner surface of the connection pipe 550.

Figure 5A:
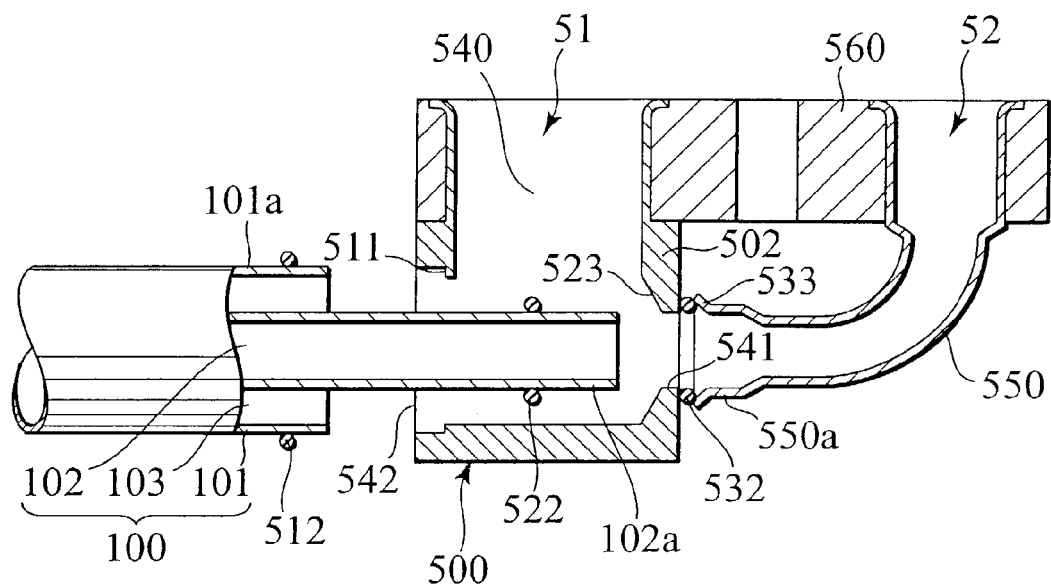
FIG. 5A is a cross-sectional view of a certain part of the double pipe and the joint before blazing according to the first embodiment of the present invention.

A size in which the inner pipe 102 is projected from the wall portion 502 and a dimension of the end 550a of the connection pipe 550 are determined so that the end 550a comes close to the wall portion 502. The brazing filler metal 532 is sandwiched between the wall portion 502 and the end 550a so as to be supported in the support portion 533. (as shown in FIG. 5A) Thereby the brazing filler metal 532 is prevented from displacing.

The first connection portion 51 is connected with the second connection portion 52 via a flange 560 shaped like a sheet. The flange 560 is provided with a through hole 561 to which the first connection portion 51 is inserted, a through hole 562 to which the second connection portion 52 and a bolt hole 563 to which fastening means such as a bolt 169 is inserted.

Before fixing the first connection portion 51 and the second connection portion 52 to the flange 560, both the first connection portion 51 and the second connection portion 52 have straight tubular shapes. First, the first connection portion 51 is rotatably fixed to the through hole 561 of the flange 560 so that an angular position of the flange 560 to the first connection portion 51 can be regulated. Next, the end portion of the first connection portion 51 is caulked outward so that the angular position of the flange 560 is fixed. The end portion of the second connection portion 52 is caulked outward and fixed to the through hole 562 in the same way. The end 550a of the connection pipe 550 is brazed to the inner pipe end portion 102a so that the flange 560 is further fixed to the first connection portion.

According to the first embodiment, both the first connection portion 51 and the second connection portion 52 are female components and both the coolant circuit pipes 35 and 37 which are respectively connected with the connection portions 51 and 52 are male components. The coolant circuit pipes 35, 37 need to be projected from the opposite flange 166 as drawn in double-dotted lines in FIG. 3B. O-rings 167, 168 are installed to the respective coolant circuit pipes 35, 37 at distal ends thereof.

Procedures of connecting the coolant circuit pipes 35, 37 to the double pipe 100 are as follows. First, the coolant circuit pipe 37 is engaged with the first connection portion 51 and the coolant circuit pipe 35 is engaged with the second connection portion 52. Next, the opposite flange 166 and the flange 560 are fastened with the bolt 169. Then the outer pipe 101 is communicated with the coolant circuit pipe 37 via the inner flow path 540 and the inner pipe 102 is communicated with the coolant circuit pipe 35 via the connection pipe 550 so that a connection of the double pipe 100 is finished. The O-rings 167, 168 prevent leakage of the cooling medium. The coolant circuit pipes 35, 37 can be fixed to the flange 560 with respective screws, then the opposite flange 166 are not necessary.

As can be seen in FIG. 3B, where the opening 542 is directed to the left and the connection portions 51, 52 are directed upward, the coolant circuit pipes 35, 37 run at right angle to the double pipe 100.

According to the first embodiment of the present invention, the outer pipe end portion 101a and the inner pipe end portion 102a are directly inserted to the branch portion 500 and respectively brazed to the first connection portion 510 and the second connection portion 520, thereby the joint 40 can be preferably applied to the double pipe 100 which are integrally formed.

In the meanwhile, the branch portion might be formed in a block-like shape and be provided with another through hole bored therein, then the inner pipe end portion 102a and the coolant circuit pipe 35 might be communicated via the through hole. But the block-like shaped branch portion causes an increase of weight of the joint. In comparison with that case, the first embodiment of the present invention improves a weight saving of the joint because the inner pipe end portion 102a and the coolant circuit pipe 35 are communicated with a light-weight piping so that the weight of the branch portion 500 is relatively small.

Figure 5B:
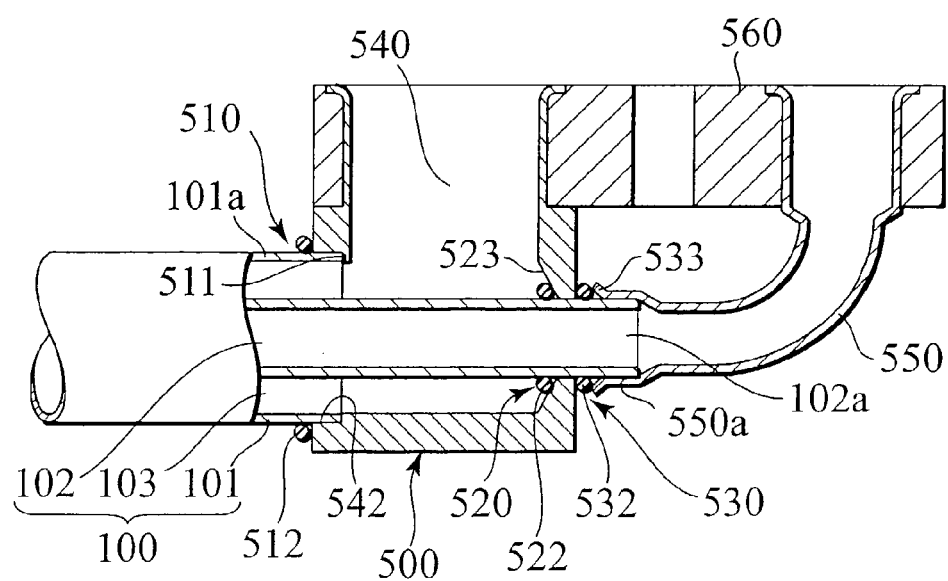
FIG. 5B is a cross-sectional view of a certain part of the double pipe and the joint during blazing according to the first embodiment of the present invention.
Figure 6:
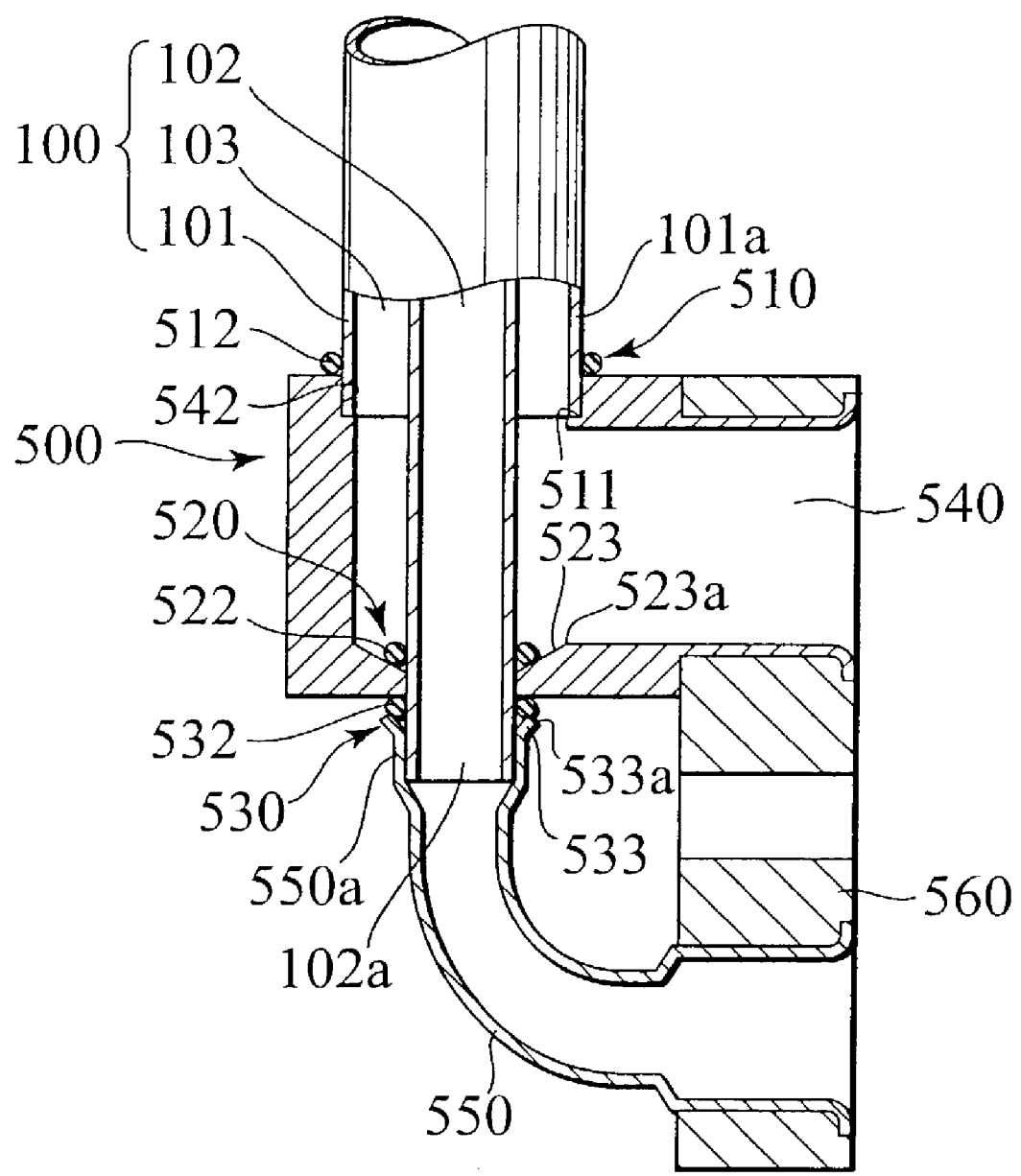
FIG. 6 is a cross-sectional view of the certain part of the double pipe and the joint showing a blazing procedure according to the first embodiment of the present invention.

Next, a method of brazing the joint 50 with the double pipe 100 where the outer pipe end portion 101a is brazed to the first junction portion 510 which is formed on the branch portion 500 and opposed outward, the inner pipe 102 is brazed to the second junction portion 520 and the connection pipe 550 is brazed to the inner pipe end portion 102a, will be described hereinafter with reference to FIGS. 5A, 5B and 6.

First, the brazing filler metal 532 is put between the wall portion 502 and the end 550a of the connection pipe 550 so as to be held in the support portion 533 as shown in FIG. 5A. The brazing filler metal 532 is formed in a ring shape and includes the metal and flux.

Next, the brazing filler metal 512 is put and supported around the outer pipe end portion 101a and the brazing filler metal 522 is put and supported around the inner pipe end portion 102a. Subsequently, the double pipe 100 is inserted into the opening 542. The brazing filler metals 512, 522 are also formed in a ring shape and include the metal and flux.

Next, the double pipe 100 is further inserted so that an end tip of the outer pipe end portion 101a abuts the stopper 511. Thereby the outer pipe end portion 101a is steadily positioned in the first junction portion 510 and the outer pipe end portion 102a passes through the wall portion 502 so as to be engaged with the connection pipe 550. The brazing filler metal 522 is supported in the support portion 523 and the brazing filler metal 532 is supported in the support portion 533.

Next, the branch portion 500 is positioned so that the periphery 523a of the support portion 523 and the aperture 533a of the support portion 533 are directed upward. In that state, the branch portion 500, the first junction portion 510 and the second junction portion 530 are heated so that the brazing filler metals 522, 530 and 532 melt and brazing is processed.

Thereby brazing of the outer pipe end portion 101a with the first junction portion 510, the inner pipe 102 with the second junction portion 520 and the connection portion 550 with the third junction portion 530 is simultaneously processed. Therefore joining process of the joint 50 and the double pipe 100 is easily and quickly achieved.

The first junction portion 510 and the third junction portion 530 are directed outward so that maintenance thereof is easy to be done. On the other hand, the second junction portion 520 is housed in the branch portion 500. Therefore, if brazing thereof is not completed, the joint 50 and the double pipe 100 in their entirety come to be an inferior product.

At this point, the brazing filler metal 522 is supported on the periphery 523a of the support portion 523 directed upward so that a molten pool of the brazing filler metal 522 is assuredly supported and the molten metal effectively flows into a small gap between the inner pipe 102 and the through hole 541 by a capillary phenomenon. Therefore the joining of the inner pipe 102 and the second junction portion 520 is assured and has enough strength so that a leakage of the cooling medium from the second junction portion 520 is effectively prevented. Thereby there are few concerns about the inferior product. Supposing that a brazing defect is formed, necessary maintenance thereof is achieved from an outside of the branch portion 500.

Furthermore, the brazing filler metal 532 is supported on the aperture 533a of the support portion 533 directed upward so that a molten pool of the brazing filler metal 532 is assuredly supported and the molten metal effectively flows into a small gap between the inner pipe end portion 102a and the connection pipe 550 by a capillary phenomenon. Therefore the joining of the connection pipe 550 and the third junction portion 530 is assured and has enough strength so that a leakage of the cooling medium from the third junction portion 530 is effectively prevented. Thereby there are few concerns about the inferior product. Supposing that a brazing defect is formed, necessary maintenance thereof is achieved from an outside of the branch portion 500 because the third junction portion 530 is directed outward.

Though heat capacity of the branch portion 500 is relatively larger than one of the outer pipe end portion 101a, the inner pipe end portion 102a or the connection pipe 550, respective heating rates need to be approximately uniform so as to get a good brazed product. Positions, temperature and heat amount of heating means such as burners and torches are approximately selected so as to uniformly heat the respective members.

More preferably, the heating process may include a preliminary heating process of heating the branch portion 500 having large heat capacity and a main heating process of heating the branch portion 500, the first junction portion 510 and the third junction portion 530 in their entirety. The branch portion 500 is heated up to a predetermined temperature at the preliminary heating process before starting the main heating process.

(Modifications of the First Embodiment)

According to the first embodiment set forth, the brazing filler metal 522 is put around the inner pipe 102 in advance. The brazing metal 522 may be disposed in the support portion 523 before the inner pipe 102 is inserted thereto.

Though three parts are simultaneously brazed according to the first embodiment set forth, simultaneous brazing is not necessary. Brazing concerning with the first junction portion 510 and the second junction portion 520 maybe achieved in advance. The third junction portion 530 may be brazed after that.

The aspects and the shapes of the brazing filler metals 512, 522 and 532 may be preferably modified. For example, flux may be coated after the brazing filler metals are disposed, instead of applying the brazing filler metal including flux. For example, brazing filler metal is wound around the outer pipe end portion 101a and flux is coated thereon after that.

More preferably, the first junction portion 510 may also be provided with a support portion like as the support portion 523, 533.

More preferably, though the embodiment wherein the first connection portion 51 and the second connection portion 52 are formed as a female type are set forth, they may be formed as union type having union nuts.

(A Second Embodiment)

Figure 7:
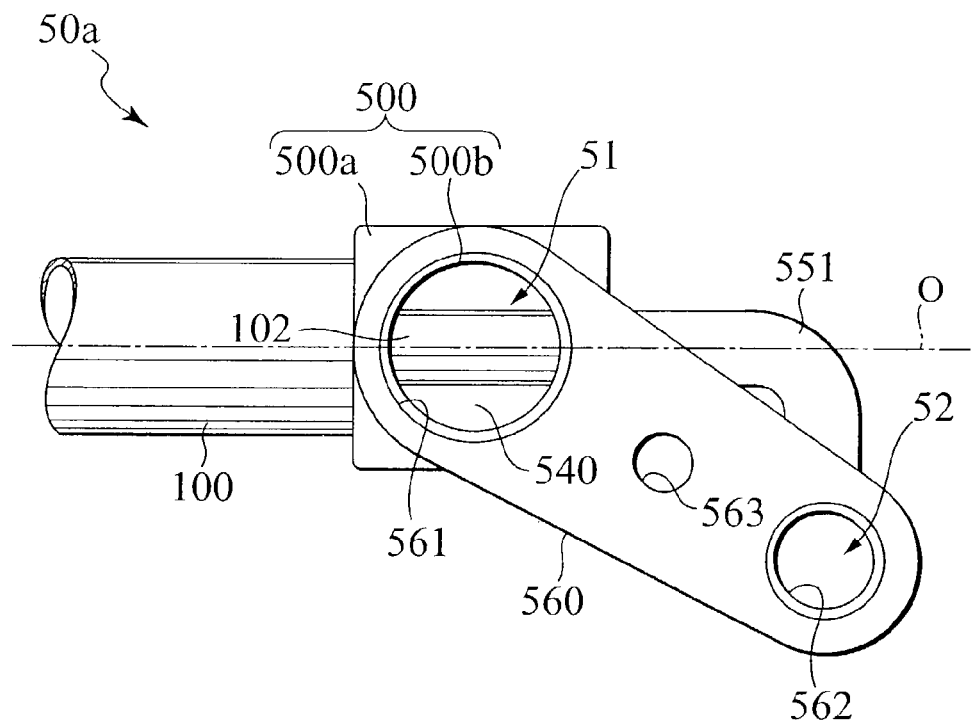
FIG. 7 is a plan view of a joint according to a second embodiment of the present invention.

A second embodiment of the present invention will be described hereinafter with reference to FIG. 7.

A joint 50a for double pipes of the second embodiment is characterized in a flange 560 which is inclined from a central axis of the double pipe 100 in comparison with the first embodiment set forth.

Depending on a piping layout of the air conditioner, a necessity that the coolant circuit pipe 35 must be disposed apart from the axis line of the double pipe 100 may arise. Even in that case, modifications of shapes of the branch portion 500 and the flange 560 and machining of the double pipe 100 should be avoided because such modifications cause an increase of the number of parts and a cost increase.

The flange 560 according to the second embodiment is rotatably fixed to the first connection portion 51 as set forth, thereby a direction thereof can be regulated around the first connection portion 51. According to the second embodiment, a modification in response to a change of the piping layout is limited to curvature of the connection pipe 551. The branch portion 500, the flange 560 and the double pipe 100 with no changes from the first embodiment can be applied to the second embodiment. Therefore the second embodiment prevents an increase of the number of parts, an increase of the brazing steps and a change of an inspection so as to contribute a reduction of a production cost of the air conditioner.

(A Third Embodiment)

Figure 8:
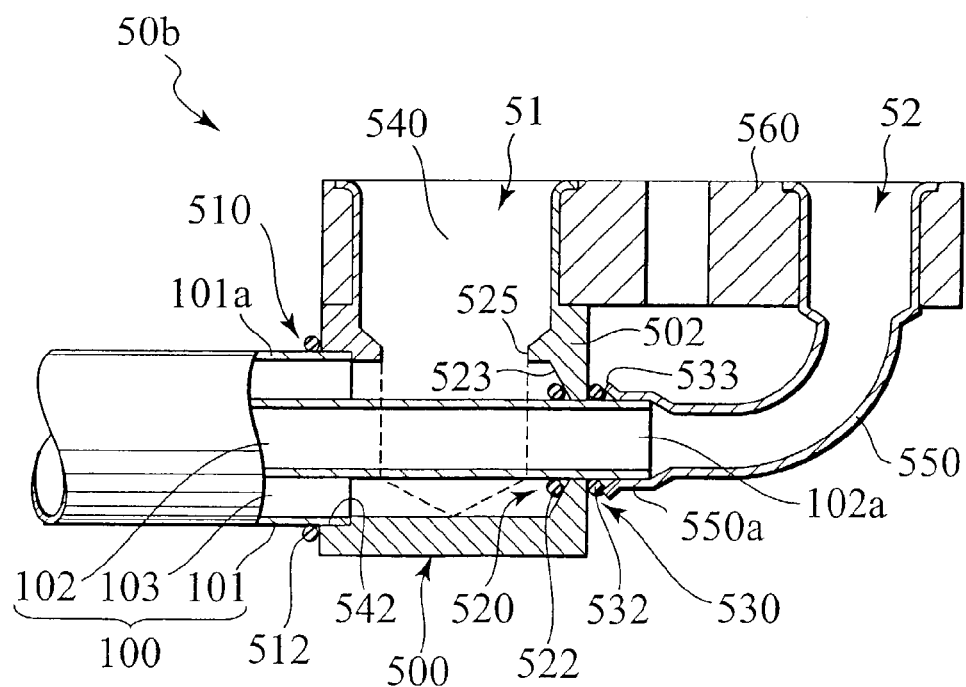
FIG. 8 is a cross-sectional view of a joint according to a third embodiment of the present invention.

A third embodiment of the present invention will be described hereinafter with reference to FIG. 8.

A joint 50b for double pipes of the third embodiment is characterized in a structure of the second junction portion 520 in comparison with the first embodiment set forth.

The second junction portion 520 of the third embodiment is provided with a support portion 523 for supporting the brazing filler metal 522 like as the first embodiment. The second junction portion 520 of the third embodiment is further provided with a barrier member 525 for preventing flow-out of the molten brazing metal 522. The barrier member 525 can be easily formed by means of drilling the branch portion 500 from an upside thereof and from the opening 542.

The barrier member 525 prevents the molten brazing filler metal 522 from flowing out from the support portion 523 in course of a brazing process. Thereby an enough amount of the molten brazing filler metal 522 can be kept in the support portion 523 even if a depth thereof is relatively small.

(A Fourth Embodiment)

Figure 9:
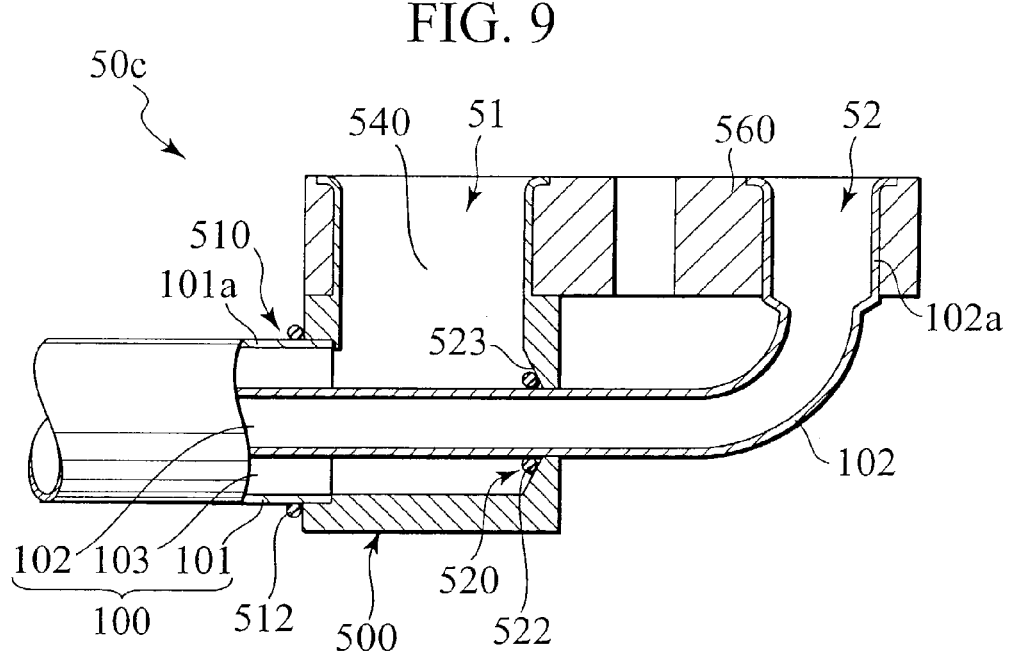
FIG. 9 is a cross-sectional view of a joint according to a fourth embodiment of the present invention.

A fourth embodiment of the present invention will be described hereinafter with reference to FIG. 9.

A joint 50c for double pipes of the fourth embodiment is characterized in omitting the connection pipe 550 in comparison with the first embodiment set forth.

Though the connection pipe 550 includes the second connection portion 52 according to the first embodiment set forth, the end tip of the inner pipe end portion 102a is machined so that the second connection connection portion 52 can be formed integral with the inner pipe 102 according to the fourth embodiment.

A portion of the inner pipe 102 projected from the outer pipe 101 is extended so as to supersede the connection pipe 550 of the first embodiment and the inner pipe end portion 102a is outspread like a flare to form a second connection portion 52. The portion outspread like a flare can be formed by means of punching the inner pipe end portion 102a. If the second connection portion 52 should be formed in a smaller diameter than the inner pipe 102, the inner pipe end portion 102a might be reduced in diameter.

According to the fourth embodiment of the present invention, one brazing step is omitted because the third junction portion 530 is omitted. Thereby the fourth embodiment contributes a reduction of a production cost of the air conditioner.

(A Fifth Embodiment)

Figure 10:
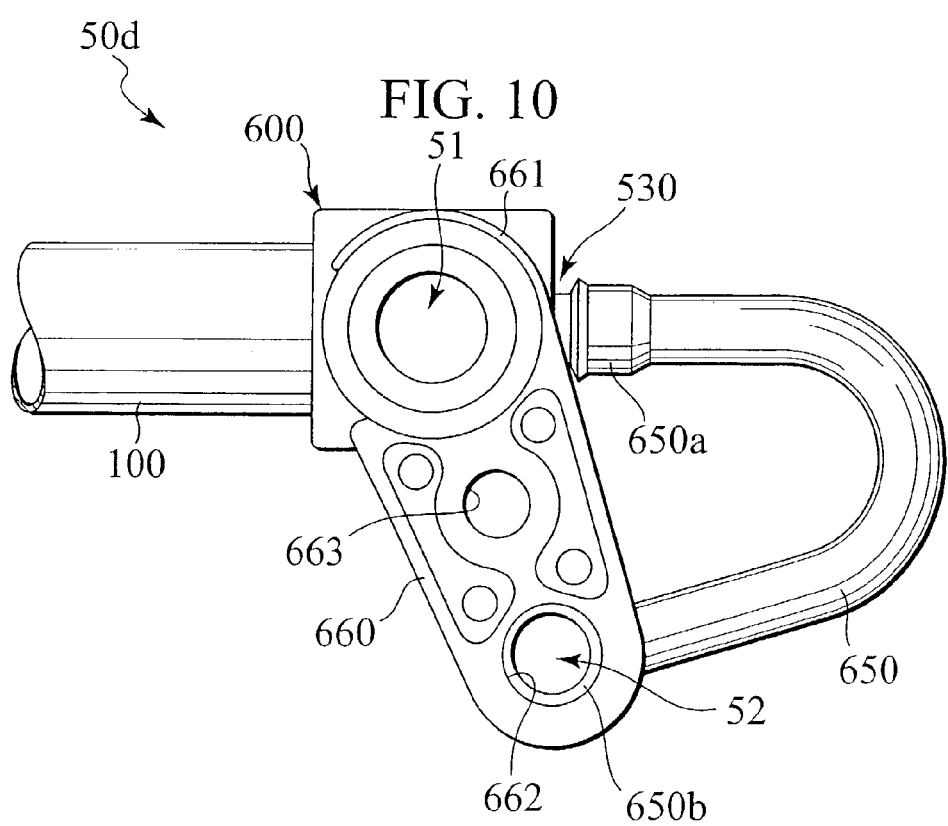
FIG. 10 is a plan view of a joint according to a fifth embodiment of the present invention.
Figure 11:
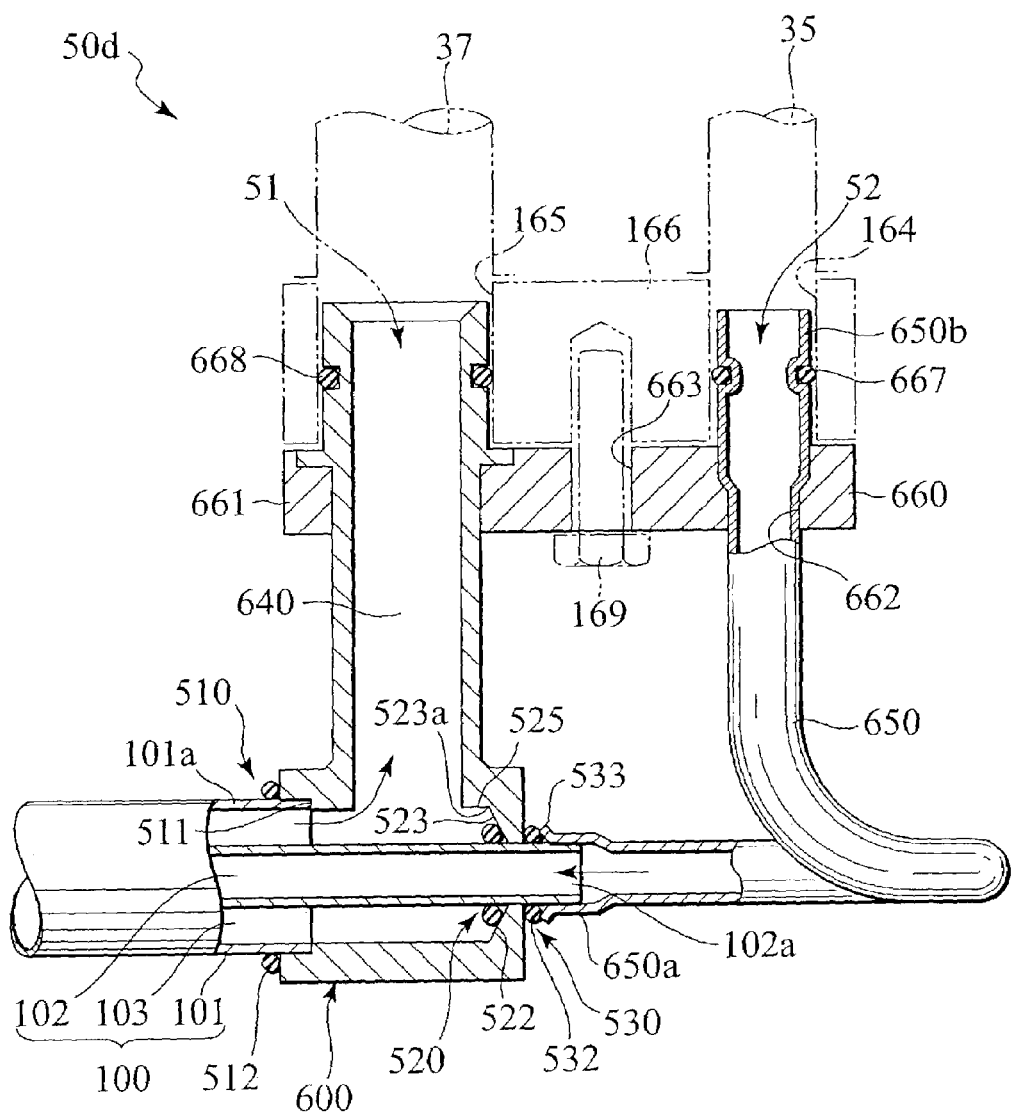
FIG. 11 is a cross-sectional view of the joint according to the fifth embodiment of the present invention.

A fifth embodiment of the present invention will be described hereinafter with reference to FIGS. 10 and 11.

A joint 50d for double pipes of the fifth embodiment is characterized in a junction structure thereof with the coolant circuit pipes 35, 37 in comparison with the first embodiment set forth.

The support portion 523 of the fifth embodiment is formed like a bell-mouthed funnel and a bell mouth portion of the funnel is a barrier portion 525.

The first connection portion 51 and the second connection portion 52 is fixed to a flange 660. The flange 660 is provided with a clip tongue piece 661 fixing around the first connection portion 51, a through hole 662 to which the second connection portion 52 is inserted and a bolt hole 663 to which fastening means such as a bolt 169 is inserted.

The flange 660 is rotatably fixed to the second connection portion 51 with the clip tongue piece 661 so that an angular position of the flange 660 to the first connection portion 51 can be regulated. When a midsection of the second connection portion 52 is fitted to the through hole 662 so, as to be caulked, the angular position of the flange 660 is fixed. The first connection portion 51 is not caulked. A second end 650b of the connection pipe 650 forms a second connection portion 52. A first end 650a of the connection pipe 650 is brazed to the inner pipe end portion 102a so that the flange 660 is finally fixed.

Both the first connection portion 51 and the second connection portion 52 are male components according to the fifth embodiment, though they are female components according to the first embodiment. Both the first connection portion 51 and the second connection portion 52 are further provided with looped grooves and o-rings 667, 668 are respectively fitted to the looped grooves. Ends of the coolant circuit pipes 35, 37 are formed as female components. The coolant circuit pipes 35, 37 are respectively connected to openings 164, 165 of the opposite flange 166 as drawn in double-dotted lines in FIG. 11.

When the coolant circuit pipes 35, 35 are connected with the double pipe 100, first, the connection portion 51 is fitted to the opening 165 and the second connection portion 52 is fitted to the opening 164. Next, the flange 660 is fixed to the opposite flange 166 with a bolt 169 so that the outer pipe 101 communicates with the coolant circuit pipe 37 via the inner flow path 640 and the inner pipe 102 communicates with the coolant circuit pipe 35 via the connection pipe 650.

Dimension and design of the joint 50d can be easily modified depending on modifications about the first connection portion 51 and the second connection portion 52. Thereby the fifth embodiment assures a design freedom and contributes a reduction of a production cost of the air conditioner.

More preferably, though the embodiment wherein the first connection portion 51 and the second connection portion 52 are formed as a male type are set forth, they may be formed as union type having union nuts.

(A Sixth Embodiment)

Figure 12A:
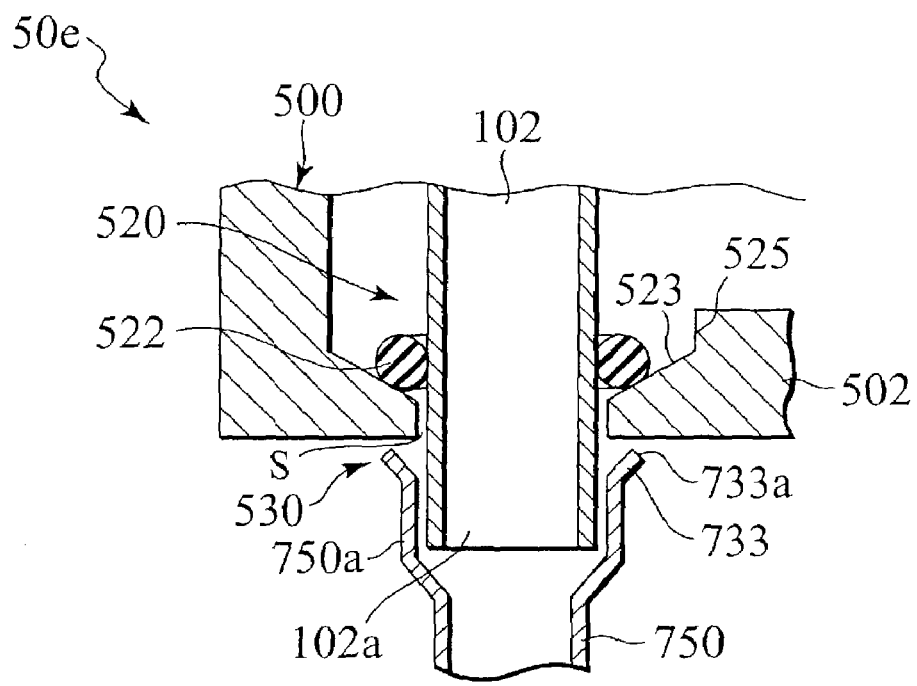
FIG. 12A is a cross-sectional view of a certain part of a joint according to the sixth embodiment of the present invention.
Figure 12B:
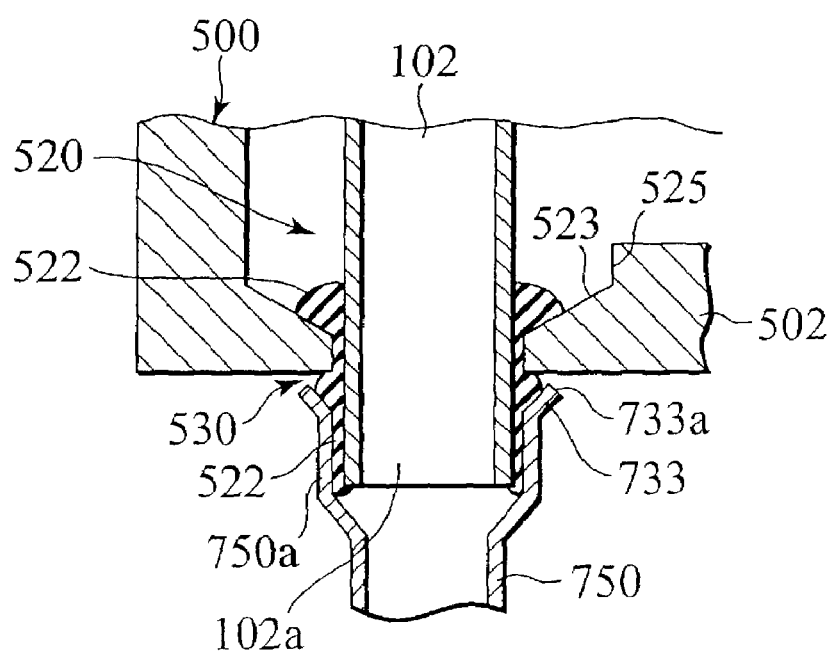
FIG. 12B is a cross-sectional view of a certain part of the joint according to the sixth embodiment of the present invention.

A sixth embodiment of the present invention will be described hereinafter with reference to FIGS. 12A and 12B.

A joint 50e for double pipes of the sixth embodiment is characterized in a structure of the third junction portion 530 in comparison with the first embodiment set forth.

An end 750a of a connection pipe 750 is formed tapered so as to be a support portion 733. When the connection pipe 750 is brazed to the inner pipe end portion 102a, an aperture 733a of the support portion 733 is faced upward. The brazing filler metal is not supported on the support portion 733 but have a function of keeping the molten brazing filler metal therein.

An inner peripheral surface of the wall portion 502 and an outer peripheral surface of the inner pipe 102 have a gap S therebetween and a size of the gap S is slightly wider than one of the first embodiment. When the brazing filler metal 522 is melted, the molten brazing filler metal 522 flows through the gap S to the support portion 733. The molten brazing filler metal 522 supported on the support portion 733 further flows into a small gap between the outer peripheral surface of the inner pipe end portion 102a and the inner peripheral surface of the connection portion 750. The brazing filler metal 522 finally fixes the end 750a of the connection pipe 750 to the inner pipe end portion 102a.

According to the sixth embodiment, it is necessary to put an enough amount of the brazing filler metal 522 on the support portion 523. Therefore preferably, the second connection portion 520 is provided with a barrier member 525 so as to prevent the molten brazing filler metal 522 from flowing out.

According to the sixth embodiment, the brazing filler metal 522 can be attached to the inner pipe end portion 102a in advance and another brazing metal needs not to be attached in course of brazing process. Therefore brazing can be achieved easier.

(A Seventh Embodiment)

Figure 13:
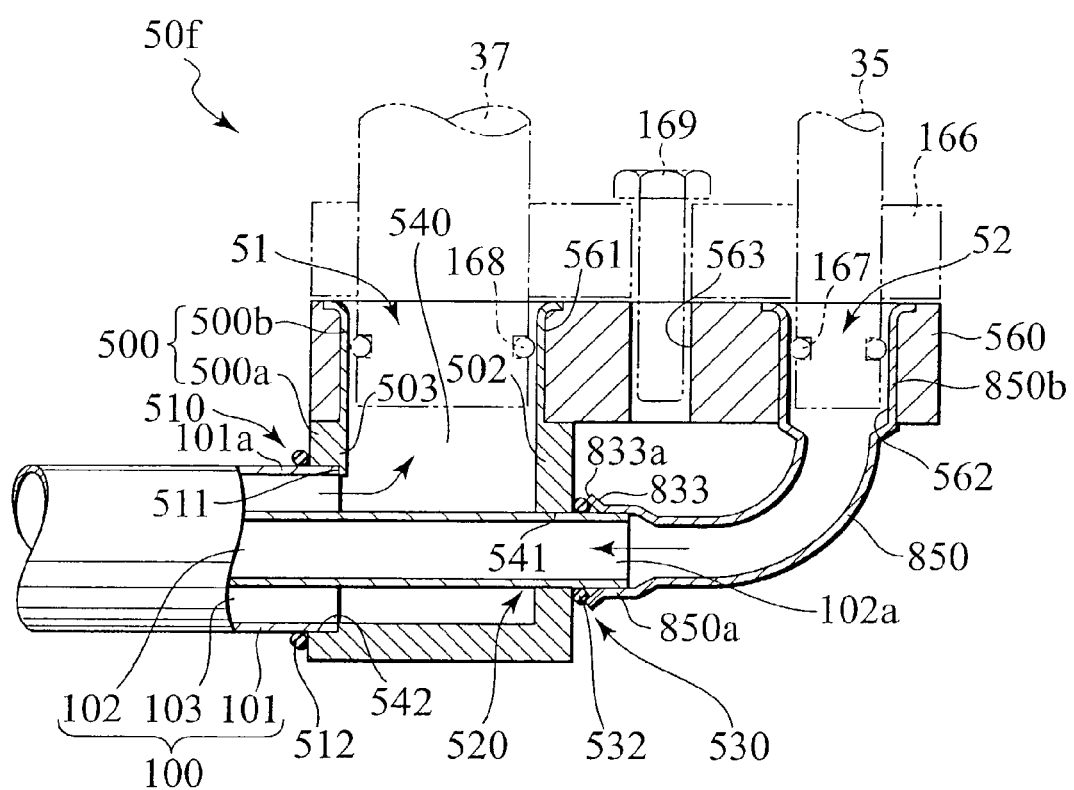
FIG. 13 is a cross-sectional view of a joint according to a seventh embodiment of the present invention.

A seventh embodiment of the present invention will be described hereinafter with reference to FIGS. 13, 14A and 14B.

A joint 50f for double pipes of the seventh embodiment is characterized in a structure of the second junction portion 520 in comparison with the first embodiment set forth.

A branch portion 500 of the joint 50f is provided with a first junction portion 510 for joining the outer pipe end portion 101a and the branch portion 500 so as to communicate the outer pipe 101 with the inner flow path 540, a wall portion 502 which the inner pipe end portion 102a penetrates and a second junction portion 520 for joining the wall portion 502 and the inner pipe end portion 102a so as to communicate the inner pipe 102 with the second connection portion 52. The second junction portion 520 of the sixth embodiment does not include a support portion and a brazing filler metal is not supported on the support portion unlike with the first embodiment.

The joint 50f is further provided with a connection pipe 850. A first end 850a of the connection pipe 850 is brazed to the inner pipe end portion 102a penetrating the through hole 541 and a second end 850b forms the second connection portion 52. The first end 850a is formed tapered so as to be a support portion 833 for supporting the brazing filler metal 532. When the connection pipe 850 is brazed to the inner pipe end portion 102a, an aperture 833a of the support portion 833 is faced upward so as to temporarily support the brazing filler metal 532 and keep the molten brazing filler metal 532 therein. The tapered shape of the support portion 833 effectively conducts the molten brazing filler metal 532 to a small gap between the outer surface of the inner pipe 102 and the inner surface of the connection pipe 850.

An inner peripheral surface of the wall portion 502 and an outer peripheral surface of the inner pipe 102 have a gap S therebetween and a size of the gap S is set so as to pump the molten brazing filler metal 532 there to by a capillary phenomenon. The molten brazing filler metal 532 is supplied to the gap S so that the inner pipe 102 is brazed to the second junction portion 520.

The molten brazing filler metal 532 is prevented from flowing out of the support portion 833 and successfully flows into the gap S by the capillary phenomenon so that the first end 850a of the connection pipe 850 is brazed to the inner pipe end portion 102a.

Brazing method of joint 50f to the double pipe 100 is described hereinafter.

First, the outer pipe end portion 101a is disposed in the the first junction portion 510 and the brazing filler metal 512 is disposed therearound.

Figure 14A:
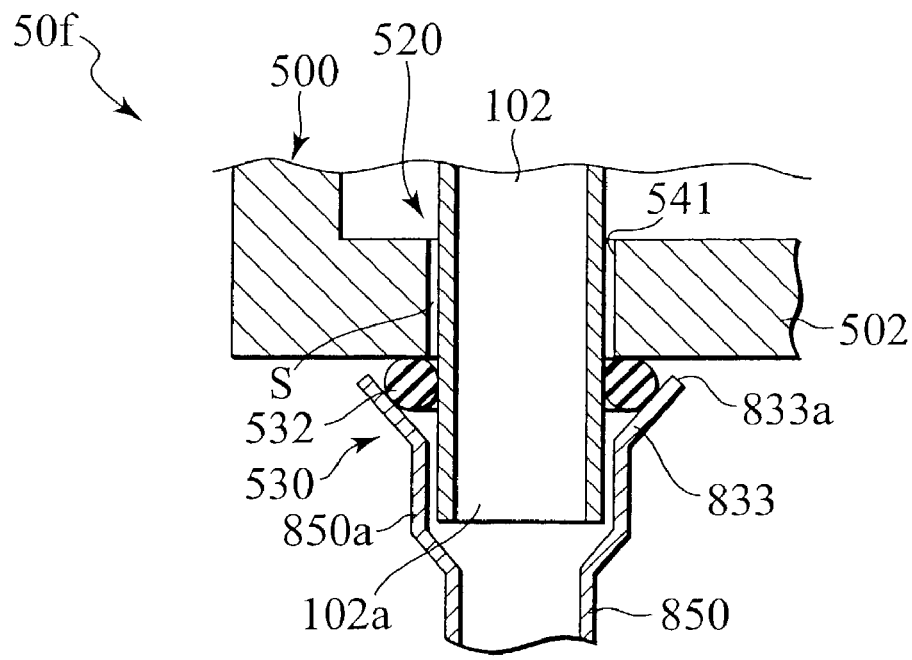
FIG. 14A is a cross-sectional view of a certain part of the joint according to the seventh embodiment of the present invention.

Next, the brazing filler metal 532 is put between the wall portion 502 and the end 850a of the connection pipe 850 so as to be held in the support portion 833 as shown in FIG. 14A.

Next, the branch portion 500 and the connection pipe 850 are heated so that the brazing filler metal 532 melts. The connection pipe 850 is brazed to the inner pipe end portion 102a and, at the same time, the molten brazing filler metal 532 is partly supplied to the gap between the wall portion 502 and the inner pipe 102 by the capillary phenomenon. The inner pipe 102 is brazed to the second junction portion 520 with the partly supplied metal 532.

According to the seventh embodiment of the present invention, the outer pipe end portion 101a and the inner pipe end portion 102a are directly inserted to the branch portion 500 and respectively brazed to the first connection portion 510 and the second connection portion 520, thereby the joint 50f can be preferably applied to the double pipe 100 which are integrally formed. Furthermore, brazing filler metal needs not to be disposed in an inside of the branch portion 500 in advance, therefore brazing can be achieved easier.

The brazing process of the outer pipe end portion 101a and the brazing process of the connection pipe 850 to the inner pipe 102 may be achieved either independently or simultaneously.

Figure 14B:
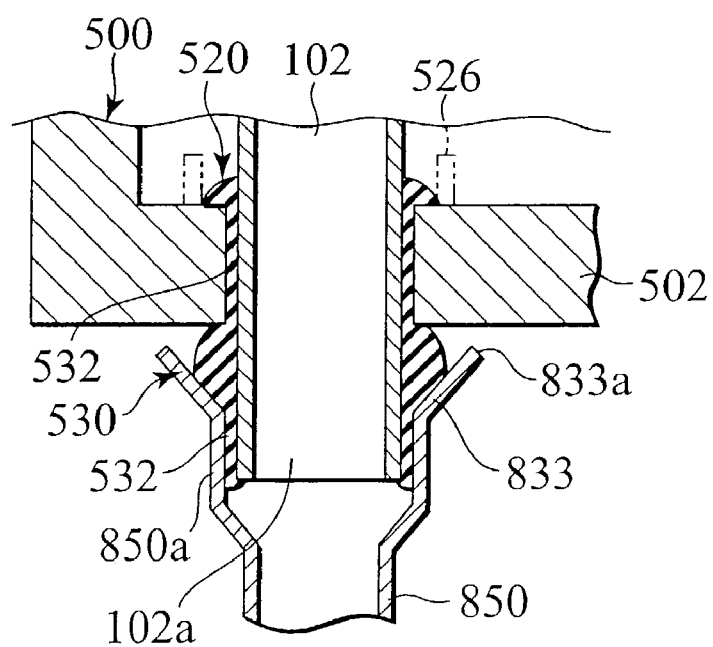
FIG. 14B is a cross-sectional view of the certain part of the joint according to the seventh embodiment of the present invention.

Preferably, the second junction portion 520 may be further provided with barrier means 526, as drawn in double-dotted lines in FIG. 14B, so as to prevent the molten brazing filler metal 532 from flowing out. The barrier means 526 is constituted of a ring-like wall projected from an inside of the wall portion 502 so as to encircle the inner pipe 102. The barrier means 526 can be a recession or a tapered recession formed on an inside surface of the wall portion 502. The barrier means 526 may be formed in various shapes so as to prevent the molten brazing filler metal 532 from flowing out. By means of the barrier means 526, an enough amount of the molten brazing filler metal 532 can be kept so that the inner pipe 102 is more solidly brazed.

(A Machining Method of the Double Pipe 100)

A machining method of the double pipe 100 will be described hereinafter.

A slit 104 is circumferentially cut from the outer surface of the outer pipe 101 so as to reach the outer surface 102a of the inner pipe 102. A distance from the end of the double pipe 100 to the slit 104 is in accordance to an exposed length of the inner pipe 102. Next, distal ends of the connection ribs 103 are cut along an axial direction from the end of the double pipe 100 by a cutting tool which is guided by an inner surface 102b of the inner pipe 102 so as to rotate and move along the axial direction. Therefore if the inner pipe 102 is misaligned from a central axis of the double pipe 100, the cutting tool cuts the connection ribs 103 to keep a thickness of the inner pipe 102. When the cutting tool reaches the slit 104, the outer pipe 101 is partly cut off and a predetermined length of the inner pipe 102 is exposed.

According to a conventional method, the outer pipe 101 and the connection ribs 103 are grinded off from the outer surface of the outer pipe 101, thereby burrs are formed on the outer pipe end portion 101a. A finishing process is necessary to remove the burrs. On the contrary, according to the embodiment of the method, the slit 104 is formed in advance so that the burrs are uneasy to be formed. The finishing process can be omitted.

The contents of Japanese Patent Application No. 2002-89786 (filed on Mar. 27, 2002) are incorporated herein by reference in its entirety.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A joint for joining a double pipe to first and second circuit pipes, the double pipe comprising an outer pipe for transfer of a first fluid, an inner pipe for transfer of a second fluid, and plural ribs for connecting the outer pipe and the inner pipe, comprising:

a flange including a first through bore and a second through bore;

a branch portion comprising:

a first connection portion for connection of the first circuit pipe, the first connection portion being inserted into the first through bore;

a first junction portion for joining the outer pipe of the double pipe, the first junction portion comprising a stopper for stopping an end of the outer pipe of the double pipe;

an inner flow path communicating the first connection portion and the first junction portion so as to transfer the first fluid between the first circuit pipe and the outer pipe of the double pipe; and a second junction portion for joining the inner pipe of the double pipe, the second junction portion comprising a through hole and a first support portion for supporting brazing filler metal for brazing the inner pipe of the double pipe with the second junction portion, the inner pipe passing through the through hole; and a connection pipe having a first end and a second end, the first end being brazed with the inner pipe of the double pipe and the second end being inserted into the second through bore and defining a second connection portion for connection of the second circuit pipe, whereby the connection pipe transfers the second fluid between the second circuit pipe and the inner pipe of the double pipe.

2. The joint according to claim 1, wherein the first support portion is formed as a conical recess on an inside of the second junction portion.

3. The joint according to claim 1, wherein the first support portion is shaped so as to keep a molten pool of the brazing filler metal when the first support portion is faced upward.

4. The joint according to claim 3, wherein the second junction portion further comprises a barrier member for preventing the molten pool from flowing out.

5. The joint according to claim 1, wherein the first connection portion and the second connection portion are formed as male or female components.

6. The joint according to claim 1, wherein the second connection portion is formed at an end portion of the inner pipe of the double pipe.

7. The joint according to claim 1, wherein the first end of the connection pipe further comprises a second support portion for supporting brazing filler metal.

8. The joint according to claim 7, wherein the second support portion is shaped so as to keep a molten pool of the brazing filler metal when the second support portion is faced upward.

9. The joint according to claim 7, wherein the brazing filler metal is sandwiched between an outer wall of the branch portion and the second support portion.

10. The joint according to claim 1, further comprising a gap held between the inner pipe of the double pipe and the through hole of the second junction portion so that molten brazing filler metal supported by the first support portion flows through the gap to braze the connection pipe with the inner pipe of the double pipe.

11. The joint according to claim 1, wherein the flange, the branch portion and the connection pipe are so dimensioned as to direct the double pipe perpendicularly to the first and second circuit pipes.

12. The joint according to claim 1, wherein the connection pipe is bent so as to direct the double pipe perpendicularly to the first and second circuit pipes.

13. The joint according to claim 1, wherein the first junction portion comprises a third support portion for supporting brazing filler metal for brazing the outer pipe of the double pipe with the second junction portion.

* * * * *